(12) United States Patent
Che et al.

(10) Patent No.: US 12,426,758 B2
(45) Date of Patent: Sep. 30, 2025

(54) METHOD AND APPARATUS FOR CONTROLLING ROBOT, ELECTRONIC DEVICE, AND COMPUTER-READABLE STORAGE MEDIUM

(71) Applicants: GREE ELECTRIC APPLIANCES, INC. OF ZHUHAI, Zhuhai (CN); ZHUHAI LEAYUN TECHNOLOGY CO. LTD, Zhuhai (CN)

(72) Inventors: Luping Che, Zhuhai (CN); Gao Chen, Zhuhai (CN); Yanyu Chen, Zhuhai (CN); Yaqi Ma, Zhuhai (CN); Longtian Tan, Zhuhai (CN)

(73) Assignees: GREE ELECTRIC APPLIANCES, INC. OF ZHUHAI, Guangdong (CN); ZHUHAI LEAYUN TECHNOLOGY CO. LTD., Guangdong (CN)

( * ) Notice: Subject to any disclaimer, the term of this patent is extended or adjusted under 35 U.S.C. 154(b) by 272 days.

(21) Appl. No.: 18/005,290

(22) PCT Filed: May 12, 2021

(86) PCT No.: PCT/CN2021/093303
§ 371 (c)(1),
(2) Date: Jan. 12, 2023

(87) PCT Pub. No.: WO2022/057285
PCT Pub. Date: Mar. 24, 2022

(65) Prior Publication Data
US 2023/0255429 A1    Aug. 17, 2023

(30) Foreign Application Priority Data
Sep. 16, 2020   (CN) .......................... 202010976682.5

(51) Int. Cl.
*A47L 11/40* (2006.01)
*G05D 1/00* (2024.01)

(52) U.S. Cl.
CPC ........ *A47L 11/4011* (2013.01); *G05D 1/0219* (2013.01); *G05D 1/0231* (2013.01); *A47L 2201/06* (2013.01)

(58) Field of Classification Search
CPC ............. A47L 11/4011; A47L 2201/06; A47L 9/2805; A47L 9/2852; A47L 11/24;
(Continued)

(56) References Cited

U.S. PATENT DOCUMENTS

2008/0191653 A1* 8/2008 Han .......................... A47L 9/00
701/25
2015/0142169 A1* 5/2015 Kim ..................... G05D 1/0238
15/98

(Continued)

FOREIGN PATENT DOCUMENTS

| CN | 205247205 U | 5/2016 |
| CN | 107898393 A | 4/2018 |

(Continued)

OTHER PUBLICATIONS

CN-110221312-A Translation (Year: 2019).*
(Continued)

*Primary Examiner* — Kenneth J Malkowski
*Assistant Examiner* — Ibrahim Abdoalatif Alsomairy
(74) *Attorney, Agent, or Firm* — Armstrong Teasdale LLP (57) ABSTRACT

A method and an apparatus for controlling a robot, an electronic device, and a computer-readable storage medium. The control method includes: acquiring an environmental map obtained by detecting a current environment; detecting the environmental map to acquire at least one right angle corner point in the environmental map; determining a coor-
(Continued)

dinate system in which the right angle corner point is located and using the right angle corner point of which the coordinate system satisfies a preset condition as a target right angle corner point; and controlling the robot to clean the target right angle corner point.

14 Claims, 4 Drawing Sheets

(58) Field of Classification Search
CPC ... A47L 11/40; A47L 2201/00; G05D 1/0219; G05D 1/0231; G05D 1/0246; G05D 1/0274; G06V 10/44; G06V 20/10
See application file for complete search history.

(56) References Cited

U.S. PATENT DOCUMENTS

| | | | |
|---|---|---|---|
| 2015/0223659 A1 | 8/2015 | Han et al. | |
| 2020/0015647 A1 | 1/2020 | Lewis | |
| 2020/0125881 A1* | 4/2020 | Pribble | G06V 30/414 |
| 2021/0154840 A1* | 5/2021 | Vogel | B25J 9/1666 |
| 2021/0272471 A1* | 9/2021 | Kolling | G09B 5/02 |

FOREIGN PATENT DOCUMENTS

| | | | | |
|---|---|---|---|---|
| CN | 109146932 A | | 1/2019 | |
| CN | 110221312 A | * | 9/2019 | |
| CN | 106786938 B | * | 3/2020 | G01S 17/46 |
| CN | 111358364 A | | 7/2020 | |
| DE | 102012109970 A1 | | 5/2014 | |
| WO | 2020107007 A1 | | 5/2020 | |

OTHER PUBLICATIONS

CN-106786938-B Translation (Year: 2020).*
Internation Search Report for corresponding International App. No. PCT/CN2021/093303, mailed Jul. 15, 2021, 2 pages.
Search Report for corresponding CN Applicaton No. 2020109766825 dated Apr. 13, 2021.

* cited by examiner

METHOD AND APPARATUS FOR CONTROLLING ROBOT, ELECTRONIC DEVICE, AND COMPUTER-READABLE STORAGE MEDIUM

CROSS-REFERENCE TO RELATED APPLICATION

The present application is a National Stage Entry of International Patent Application No. PCT/CN2021/093303, filed May 12, 2021, which claims priority to Chinese patent application No. 202010976682.5, filed to the China National Intellectual Property Administration on Sep. 16, 2020 and entitled "METHOD AND APPARATUS FOR CONTROLLING ROBOT, ELECTRONIC DEVICE, AND COMPUTER-READABLE STORAGE MEDIUM," the disclosure of which are hereby incorporated by reference in their entirety.

TECHNICAL FIELD

The disclosure relates to the field of intelligent robot control, in particular, to a method and an apparatus for controlling a robot, an electronic device, and a computer-readable storage medium.

BACKGROUND

With the rapid development of artificial intelligence, a large number of cleaning robots have emerged on the market. The emergence of the cleaning robots greatly frees human hands, which makes the lives of people more convenient. Faced with fierce market for the cleaning robots, how to make the cleaning robots clean more thorough becomes the core design of the cleaning robots.

Currently, the model shape of a conventional cleaning robot in the market is circular. The circular cleaning robot has a natural weakness for a right angle corner, which cannot completely cover the corner area, resulting in incomplete cleaning. In the related art, in order to resolve the problem, a cleaning robot with a D-shaped structure is used. However, during the implementation of the disclosure, the inventor discovered that, since there are various types of right angle corner points, for example, inner right angle corner points and outer right angle corner points, the D-shaped cleaning robot cannot accurately distinguish the types of the right angle corner points by using a conventional corner detection algorithm, such that a cleaning operation cannot be accurately executed on the right angle corner points.

SUMMARY

The disclosure provides a method and an apparatus for controlling a robot, an electronic device, and a computer-readable storage medium.

Another aspect of some embodiments of the disclosure provides a method for controlling a robot, including:
 an environmental map obtained by detecting a current environment is acquired;
 the environmental map is detected to acquire at least one right angle corner point in the environmental map;
 a coordinate system in which the right angle corner point is located is determined, and the right angle corner point of which the coordinate system satisfies a preset condition is used as a target right angle corner point;
 the robot is controlled to clean the target right angle corner point.

In some implementations, the environmental map is detected to acquire the at least one right angle corner point in the environmental map includes:
 a corner detection algorithm is used to process the environmental map, so as to obtain a corner detection image;
 the corner detection image is denoised to obtain a corner point denoising image;
 piecewise linear fitting is performed on corner points in the corner point denoising image, so as to obtain the at least one right angle corner point in the environmental map.

In some implementations, the coordinate system in which the right angle corner point is located is determined, and the right angle corner point of which the coordinate system satisfies the preset condition is used as the target right angle corner point includes:
 coordinates of the right angle corner point are used as original points to establish a plane rectangular coordinate system;
 grayscale values of quadrants in the plane rectangular coordinate system are determined;
 the quadrant of which the grayscale value in the plane rectangular coordinate system satisfies a preset grayscale value is used as a target quadrant;
 the right angle corner point of which a number of the target quadrants in the plane rectangular coordinate system is greater than a preset number is determined as the target right angle corner point.

In some implementations, the robot is controlled to clean the target right angle corner point includes:
 position information of the target right angle corner point in the environmental map is acquired;
 a target location is determined according to the position information and a shape parameter of the robot;
 the robot is controlled to move to the target location, so as to clean the target right angle corner point.

In some implementations, the robot is controlled to move to the target location, so as to clean the target right angle corner point includes:
 an environment type and a ground attribute of the target right angle corner point are determined;
 a cleaning mode of the target right angle corner point is determined according to the environment type and the ground attribute;
 according to the cleaning mode, the robot is controlled to clean the target right angle corner point.

In some implementations, the method further includes:
 a detection image is acquired, and the detection image is obtained by scanning a position of the target right angle corner point by means of the robot at the target location;
 the detection image is analyzed to determine at least one object to be processed, and an object type and object information of the object to be processed are acquired;
 a processing strategy is determined according to the object type and the object information;
 according to the processing strategy, the robot is controlled to process the object to be processed.

In some implementations, the method further includes:
 a historical processing record is acquired;
 according to the historical processing record, a processing period of the object to be processed is determined;
 the target right angle corner point is maintained according to the processing period.

Another aspect of some embodiments of the disclosure further provides an apparatus for controlling a robot, including:

an acquisition component, configured to acquire an environmental map obtained by detecting a current environment;

a detection component, configured to detect the environmental map to obtain at least one right angle corner point in the environmental map;

a determination component, configured to determine a coordinate system in which the right angle corner point is located, and use the right angle corner point of which the coordinate system satisfies a preset condition as a target right angle corner point;

a control component, configured to control the robot to clean the target right angle corner point.

Another aspect of some embodiments of the disclosure further provides a computer-readable storage medium. The computer-readable storage medium includes a stored program. When the program is operated, the above steps are executed.

Another aspect of some embodiments of the disclosure further provides an electronic device, including a processor, a communication interface, a memory, and a communication bus. The processor, the communication interface and the memory communicate with each other by means of the communication bus. The memory is configured to store a computer program. The processor is configured to execute steps of the above method by operating a program stored on the memory.

Some embodiments of the disclosure further provide a computer program product including an instruction. When the computer program product is operated on a computer, the computer executes steps in the above method.

BRIEF DESCRIPTION OF THE DRAWINGS

Drawings are incorporated into the specification and constitute a part of the specification. The drawings illustrate embodiments in accordance with the disclosure and serve to understand the principles of the disclosure together with the specification.

In order to more clearly illustrate the embodiments of the disclosure or the technical solutions in the related art, the drawings used in the description of the embodiments or the related art will be briefly described below. It is apparent that other drawings can be obtained from those skilled in the art according to these drawings without any creative work.

DETAILED DESCRIPTION OF THE EMBODIMENTS

In order to make objectives, technical solutions, and advantages of embodiments of the disclosure clearer, the technical solutions in the embodiments of the disclosure will be clearly and completely described below in combination with the drawings in the embodiments of the disclosure. It is apparent that the described embodiments are only part of the embodiments of the disclosure, not all the embodiments. The exemplary embodiments of the disclosure and the description thereof are used to explain the present disclosure, but do not constitute improper limitations to the disclosure. Based on the embodiments in the disclosure, all other embodiments obtained by those of ordinary skilled in the art without creative work shall fall within the protection scope of the disclosure.

It is also to be noted that relational terms such as first and second are used merely to distinguish one entity or operation from another similar entity or operation herein, and do not necessarily require or imply the existence of any such actual relationship or order between these entities or operations. Furthermore, terms "contain", "include" or any other variants are intended to encompass non-exclusive inclusion, such that a process, a method, an article or a device including a series of elements not only include those elements, but also includes other elements not listed explicitly or includes intrinsic elements for the process, the method, the article, or the device. Without any further limitation, an element defined by the phrase "including one" does not exclude existence of other same elements in the process, the method, the article, or the device that includes the elements.

Embodiments of the disclosure provide a method and an apparatus for controlling a robot, an electronic device, and a computer-readable storage medium. The method provided in the embodiments of the disclosure is applicable to any required electronic device such as a server and a terminal, which is not specifically limited herein. For ease of description, hereinafter referred to as the electronic device.

Figure 1:
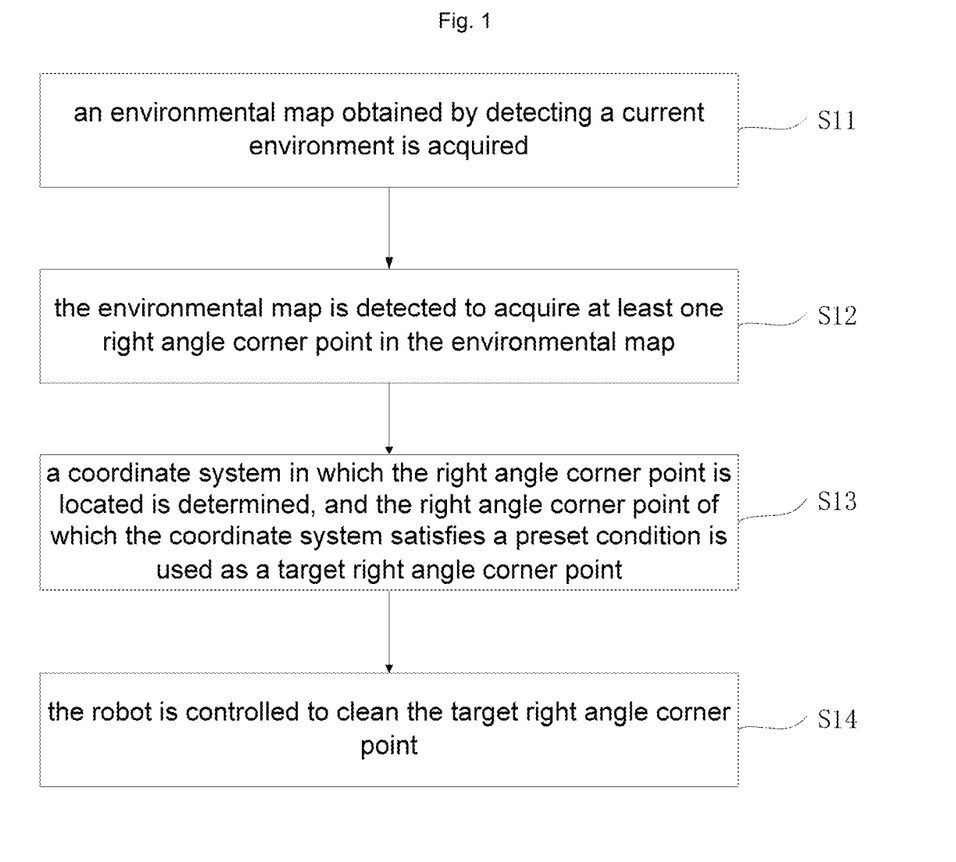
FIG. 1 is a flowchart of a method for controlling a robot according to some embodiments of the disclosure.

An aspect of some embodiments of the disclosure provides a method embodiment of a method for controlling a robot. FIG. 1 is a flowchart of a method for controlling a smart home device according to some embodiments of the disclosure. As shown in FIG. 1, the method includes the following steps.

Step 11, an environmental map obtained by detecting a current environment is acquired.

In this embodiment of the disclosure, a radar apparatus disposed on the robot is used to transmit a radar signal, then point cloud data is determined according to an echo signal of the radar signal, and feature analysis is performed on the point cloud data, so as to determine the environmental map of the current environment. As an example, by analyzing features of the point cloud data, a wall in the current environment can be determined; and a boundary of the current environment is determined according to the wall, or can be determined by means of objects placed close to the wall, such as a wardrobe, a refrigerator and a sofa. Then, objects inside the boundary are analyzed, finally, the environmental map of the current environment is obtained. The environmental map can be a two-dimensional plane figure, or can be a three-dimensional stereogram. The robot in this embodiment of the disclosure is a D-shaped cleaning robot.

In addition, it can also receive an environmental map sent by a mobile terminal. The environmental map can be a floor plan or a plane design drawing.

Step 12, the environmental map is detected to acquire at least one right angle corner point in the environmental map.

In this embodiment of the disclosure, a corner detection algorithm is used to process the environmental map so as to obtain a corner detection image. The corner detection image is denoised to obtain a corner point denoising image. Piecewise linear fitting is performed on corner points in the corner point denoising image, so as to obtain the at least one right angle corner point in the environmental map. The corner detection algorithm can be a Shi-Tomasi corner detection algorithm, a Harris corner detection algorithm, or the like.

As an example, the corner points of an grabbing image by the Shi-Tomasi corner detection algorithm; noise is removed by means of a K-neighbor method, and only the corner points on an edge of the environmental map are retained; then piecewise linear fitting is performed on the corner points on the edge of the environmental map; and the corner points after Shi-Tomasi detection and neighborhood denoising are fed back by means of intersection points of lines after piecewise linear fitting, so as to obtain the right angle corner points on the edge of the environmental map. The right angle corner points include inward turning right angle corner points and outward turning right angle corner points.

It is understandable that, the corner point is generally defined as an intersection point of two or more than two edges. Strictly speaking, the local neighborhood of the corner point has boundaries of two different areas in different directions. Then, for an image, if a tiny change of a certain point in the image in any direction causes a great change in grayscale, so that it is called the corner point. Currently, what most image corner detection methods detect are image points having specific features. These feature points have specific coordinates in the image and have certain mathematical features, for example, local maximum or minimum grayscale, and certain gradient features. The Shi-Tomasi corner detection algorithm is a method in a computer vision system that is used for obtaining image features.

Step 13, a coordinate system in which the right angle corner point is located is determined, and the right angle corner point of which the coordinate system satisfies a preset condition is used as a target right angle corner point.

In this embodiment of the disclosure, coordinates of the right angle corner point are used as original points to establish a plane rectangular coordinate system. Grayscale values of quadrants in the plane rectangular coordinate system are determined. The quadrant of which the grayscale value in the plane rectangular coordinate system satisfies a preset condition is used as a target quadrant. The target right angle corner point is determined according to a number of the target quadrants. Specifically, each quadrant is extracted from the coordinate system to obtain a quadrant image; then the quadrant image is converted into an RGB image; and a grayscale value of the quadrant is determined according to the RGB image.

Figure 2:
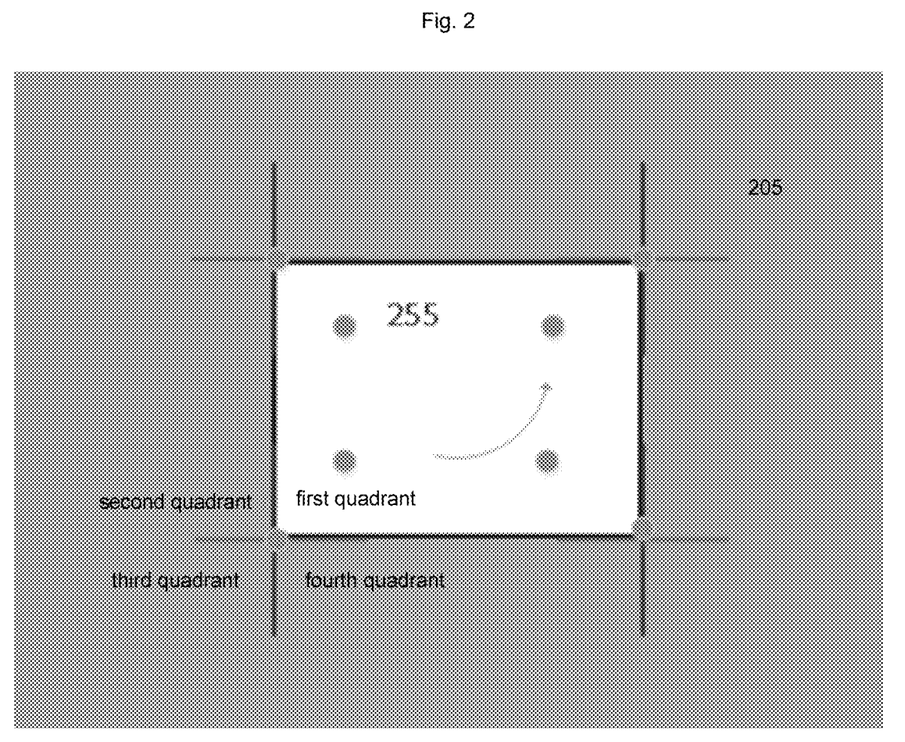
FIG. 2 is a schematic diagram of an environmental map according to some embodiments of the disclosure.

As an example, as shown in FIG. 2, when the environmental map is a two-dimensional planar map, the right angle corner point is used as the original point to establish the plane rectangular coordinate system, and the grayscale value of each quadrant in the plane rectangular coordinate system is determined. When the grayscale value is greater than a preset grayscale value, the quadrant is the target quadrant. When there are three target quadrants in the plane rectangular coordinate system, the right angle corner point is determined as the target right angle corner point. It is understandable that, the target right angle corner point is the inward turning right angle corner point.

Step 14, the robot is controlled to clean the target right angle corner point.

In this embodiment of the disclosure, the robot is controlled to clean the target right angle corner point includes: position information of the target right angle corner point in the environmental map is acquired; a target location is determined according to the position information and a shape parameter of the robot; and the robot is controlled to move to the target location, so as to clean the target right angle corner point.

As an example, a position 2 times the body length of the robot from the right angle corner point is used as the target location. Then, the robot is controlled to move to the target location, and can clean, according to a right-handed rotation cleaning mode, an area in which the right angle corner point is located. As shown in FIG. 2, for example, if a white area is located in a first quadrant, a cleaning robot is moved to the target location, and then adjusts an angle to cause the robot to face the corner, so as to perform the cleaning operation.

In addition, due to the complexity of the map, corner detection and recognition of the right angle area is very important. Since the smoothness of cleaning along the edge is taken into consideration, a certain distance is also left for the right angle area for corner movement, resulting in unclean cleaning of the right angle area.

Therefore, the robot is controlled to move to the target location, so as to clean the target right angle corner point includes: an environment type and a ground attribute of the target right angle corner point are determined; a cleaning mode of the target right angle corner point is determined according to the environment type and the ground attribute; and according to the cleaning mode, the robot is controlled to clean the target right angle corner point.

As an example, the ground attribute includes a concrete attribute, a marble attribute, a wood attribute, a tile attribute, and a carpet attribute. Specifically, the robot can recognize a floor area by means of a ground attribute recognition model that is trained by a deep learning neural network, so as to obtain the ground attribute of the target right angle corner point.

The cleaning mode is a cleaning manner that is set for the robot in advance. Different environment types and different floor material types correspond to different cleaning modes. The cleaning mode can include, but is not limited to, cleaning types, cleaning intensity, cleaning time and cleaning frequencies. The cleaning intensity refers to the strength of cleaning, for example, suction and wiping force. The cleaning time refers to a time point of cleaning. The cleaning frequency is a time interval of cleaning, or can be a cleaning period.

Specifically, the robot can determine the environment type according to environment attribute information. The environment type can be a kitchen, a bedroom, a living room, or the like. Then, the cleaning mode corresponding to the environment type is determined, and the cleaning mode corresponding to the ground attribute is determined. The cleaning mode corresponding to the environment type and the cleaning mode corresponding to the ground attribute are then analyzed in a combined manner, so as to obtain the cleaning mode corresponding to the target right angle corner point.

As an example, the environment type includes, but is not limited to, function characteristics of environments. For example, the function characteristic of the kitchen is diet management, there can be many kitchen wastes at the right angle corner point of the kitchen at the time period of daily cooking. In this case, the cleaning mode corresponding to the environment type can be set to clean the kitchen at 12:30 p.m. and 19:00 p.m. The ground attribute includes, but is not limited to, the wear resistance of the floor. For example, the wear resistance of the wooden floor is relatively poor, and if the cleaning intensity is too large, the wooden floor can be scratched, so that the cleaning intensity needs to be well controlled, and the wooden floor can be cleaned by low cleaning intensity, so as to protect the wooden floor. In this way, when the floor of the kitchen is the wooden floor, the corresponding cleaning strategy can be that, wiping with low cleaning intensity is performed on the kitchen for a plurality of times at 10:00 a.m. and 15:00 p.m, so that the floor is protected while the cleaning effect is guaranteed. Therefore, the final cleaning mode corresponding to the target right angle corner point is that, the cleaning with high cleaning intensity is performed on the kitchen at 12:30 p.m. and 19:00 p.m, and then the wiping with low cleaning intensity is performed on the kitchen for the plurality of times at 10:00 a.m. and 15:00 p.m.

In the embodiments of the disclosure, by means of determining the coordinate system in which the right angle corner point is located and then using the right angle corner point of which the coordinate system satisfies the preset condition as the target right angle corner point, the technical problem that the robot cannot accurately distinguish the corner point type of right angle corner points by a conventional corner detection algorithm can be resolved, thereby achieving the technical effect of accurately cleaning the right angle corner points.

Figure 3:
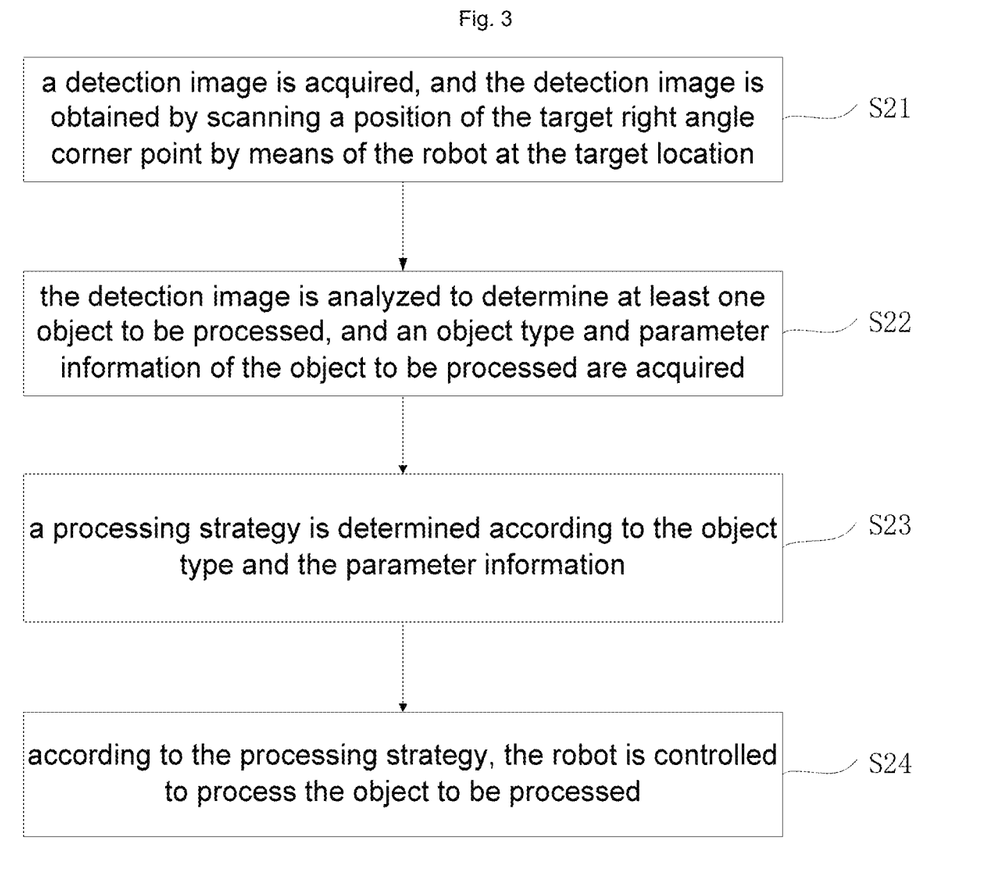
FIG. 3 is a flowchart of a method for controlling a robot according to another embodiment of the disclosure.

FIG. 3 is a flowchart of a method for controlling a robot according to another embodiment of the disclosure. As shown in FIG. 3, the method includes the following steps.

Step 21, a detection image is acquired, and the detection image is obtained by scanning a position of the target right angle corner point by means of the robot at the target location.

In this embodiment of the disclosure, when the robot arrives at the target location, the area in which the target right angle corner point is located is scanned to obtain the detection image. It is understandable that, the detection image can include a plurality of images, for example, a corner image, a wall image, a wall-seam image and a floor image.

Step 22, the detection image is analyzed to determine at least one object to be processed, and an object type and parameter information of the object to be processed are acquired, and the parameter information is also called object information.

In this embodiment of the disclosure, the detection image is inputted into a pre-trained recognition model; and then the recognition model determines, according to feature information in the detection image, the object to be processed. The recognition model can be obtained through training a deep learning neural network. The object to be processed can be spider webs, oil stains, mildew spots, or the like. The object type of the spider webs is sundries; the object type of the oil stains is a contaminant; and the object type of the mildew spots or mildew is mould. The parameter information can be the area, thickness and height of the object to be processed.

Step 23, a processing strategy is determined according to the object type and the parameter information.

In this embodiment of the disclosure, the processing strategy refers to a cleaning rule that is set for the robot in advance. Different object types and different parameter information correspond to different processing strategies. The processing strategy can include, but is not limited to, a processing type, a processing parameter, and the like. The processing type can be blowing, wiping, disinfectant spraying, or the like. The processing parameter can be the strength of wind force, the strength of wiping, and the dosage of the required disinfectant.

As an example, when the object to be processed is the spider web, the processing type is blowing; then the height and area of the spider web are determined; and the strength of wind force is finally determined according to the height and the area. When the object to be processed is the mildew spots or the mildew, the processing type is disinfectant spraying and wiping; then the areas of the mildew spots and the mildew are determined; the dosage of the disinfectant and the strength of wiping are determined according to the area of the mildew spots or the mildew.

Step 24, according to the processing strategy, the robot is controlled to process the object to be processed.

In this embodiment of the disclosure, the object to be processed is acquired according to the detection image, and the processing strategy is determined according to the object to be processed, so as to process the target right angle corner point, so that the robot can automatically detects the position of the right angle corner point and processes the detected object to be processed, thereby resolving the limitation that the robot only cleans the floor, and improving the intelligence of the robot.

The method provided in this embodiment of the disclosure further includes: a historical processing record is acquired; according to the historical processing record, a processing period of the object to be processed is determined; and the target right angle corner point is maintained according to the processing period.

As an example, it is determined that the mildew spots or the mildew is required to be processed every seven days according to the historical processing record. Then, the environment in which the target right angle corner point is located is determined to be humid, and the maintenance operation can be to dry and disinfect the target right angle corner point every other day. Therefore, the mould-type object to be processed can be prevented from occurring frequently.

Figure 4:
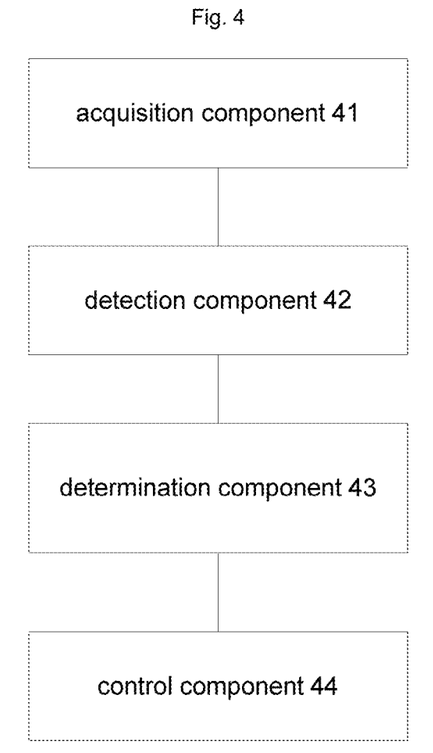
FIG. 4 is a block diagram of an apparatus for controlling a robot according to some embodiments of the disclosure.

FIG. 4 is a block diagram of an apparatus for controlling a robot according to some embodiments of the disclosure. The apparatus can be implemented as part or all of an electronic device by means of software, hardware or a combination thereof. As shown in FIG. 4, the apparatus includes:

an acquisition component 41 configured to acquire an environmental map obtained by detecting a current environment;

a detection component 42 configured to detect the environmental map to obtain at least one right angle corner point in the environmental map;

a determination component 43 configured to determine a coordinate system in which the right angle corner point is located, and use the right angle corner point of which the coordinate system satisfies a preset condition as a target right angle corner point;

a control component 44 configured to control the robot to clean the target right angle corner point.

In some implementations, the detection component 42 is specifically configured to: use a corner detection algorithm to process the environmental map, so as to obtain a corner detection image; denoise the corner detection image to obtain a corner point denoising image; and perform piecewise linear fitting on corner points in the corner point denoising image, so as to obtain the at least one right angle corner point in the environmental map.

In some implementations, the determination component 43 is specifically configured to: use coordinates of the right angle corner point as original points to establish a plane rectangular coordinate system; determine grayscale values of quadrants in the plane rectangular coordinate system; use the quadrant of which the grayscale value in the plane rectangular coordinate system satisfies a preset condition as a target quadrant; and determine the target right angle corner point according to a number of the target quadrants.

In some implementations, the control component 44 includes:

an acquisition sub-component configured to acquire position information of the target right angle corner point in the environmental map;

a determination sub-component configured to determine a target location according to the position information and a shape parameter of the robot;

a control sub-component configured to control the robot to move to the target location, so as to clean the target right angle corner point.

In some implementations, the control sub-component is specifically configured to: determine an environment type and a ground attribute of the target right angle corner point; determine a cleaning mode of the target right angle corner point according to the environment type and the ground attribute; and control, according to the cleaning mode, the robot to clean the target right angle corner point.

In some implementations, the apparatus provided in this embodiment of the disclosure further includes a processing component. The processing component is configured to: acquire a detection image, and the detection image is obtained by scanning a position of the target right angle corner point by means of the robot at the target location; analyze the detection image to determine at least one object to be processed, and acquire an object type and parameter information of the object to be processed; determine a processing strategy according to the object type and the parameter information; and control, according to the processing strategy, the robot to process the object to be processed.

In some implementations, the processing component provided in this embodiment of the disclosure is further configured to: acquire a historical processing record; determine, according to the historical processing record, a processing period of the object to be processed; and maintain the target right angle corner point according to the processing period.

Figure 5:
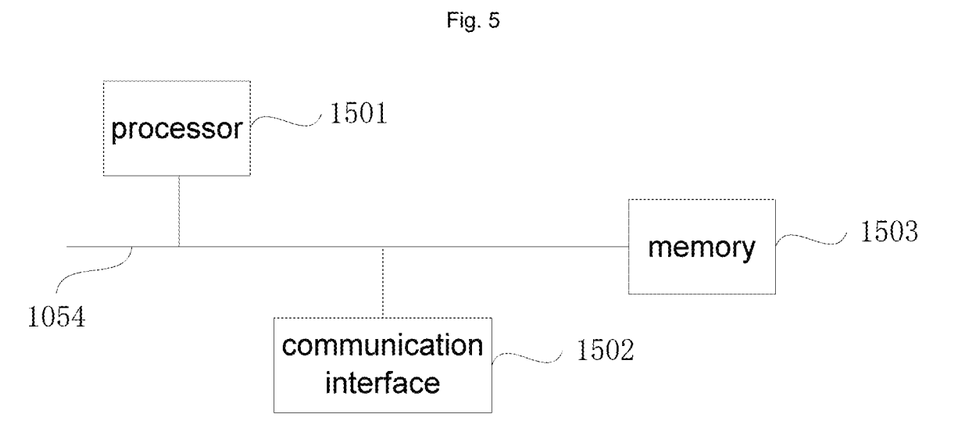
FIG. 5 is a schematic structural diagram of an electronic device according to some embodiments of the disclosure.

Some embodiments of the present disclosure further provide an electronic device. As shown in FIG. 5, the electronic device can include a processor 1501, a communication interface 1502, a memory 1503 and a communication bus 1504. The processor 1501, the communication interface 1502 and the memory 1503 communicate with each other by using the communication bus 1504.

The memory 1503 is configured to store a computer program.

The processor 1501 is configured to implement steps of the above embodiments when the computer program stored on the memory 1503 is executed.

The communication bus mentioned in the above terminal can be a Peripheral Component Interconnect (PCI) bus or an Extended Industry Standard Architecture (EISA) bus, or the like. The communication bus can be divided into an address bus, a data bus, a control bus, and the like. For ease of presentation, only one thick line is used in the figure, but it does not mean that there is only one bus or one type of buses.

The communication interface is configured to achieve communication between the terminal and other devices.

The memory can include a Random Access Memory (RAM), or can include a non-volatile memory (non-volatile memory), such as at least one disk memory. In some implementations, the memory can also be at least one storage apparatus located remotely from the foregoing processor.

The above processor can be a general processor, including a Central Processing Unit (CPU) and a Network Processor (NP), or can be a Digital Signal Processor (DSP), an Application Specific Integrated Circuit (ASIC), a Field-Programmable Gate Array (FPGA) or other programmable logic devices, discrete gate or transistor logic devices, and discrete hardware components.

Still another embodiment of the disclosure further provides a computer-readable storage medium. The computer-readable storage medium stores an instruction. When the instruction is operated on a computer, the computer executes the method for controlling a robot described in any one of the above embodiments.

Still another embodiment of the disclosure further provides a computer program product including an instruction. When the computer program product is operated on a computer, the computer executes the method for controlling a robot described in any one of the above embodiments.

In the above embodiments, it can be implemented in whole or in part by software, hardware, firmware, or any combination thereof. When the software is used for implementation, it can be implemented in whole or in part in the form of the computer program product. The computer program product includes one or more computer instructions. When the above computer program instruction is loaded and executed on a computer, the above processes or functions according to the embodiments of the disclosure are generated in whole or in part. The above computer can be a general computer, a special computer, a computer network, or other programmable apparatus. The above computer instruction can be stored in the computer-readable storage medium or transmitted from one computer-readable storage medium to another computer-readable storage medium. For example, the above computer instruction can be transmitted from a website site, a computer, a server, or a data center to another website site, another computer, another server, or another data center via wire (for example, a coaxial cable, an optical fiber, a digital subscriber line) or wireless (for example, infrared, wireless, microwave, or the like). The computer-readable storage medium can be any available medium that can be accessed by a computer, or a data storage device, such as a server and a data center, that includes one or more available mediums integrated. The above available medium can be a magnetic medium (for example, a floppy disk, a hard disk, and a magnetic tape), an optical medium (for example, DVD), or a semiconductor medium (for example, Solid State Disk), and the like.

The above descriptions are merely preferred embodiments of the disclosure, and are not intended to limit the protection scope of the disclosure. Any modifications, equivalent replacements, improvements and the like made within the spirit and principle of the disclosure fall within the scope of protection of the disclosure.

The above is merely the implementation of the disclosure, to make a person skilled in the art to understand or implement the disclosure. Obviously, the technical personnel in the art will make many modifications to these embodiments, the general principles defined in the disclosure can be achieved in the other embodiments without departing from the spirit or essential attributes of the disclosure. Therefore, the disclosure will not be limited to the embodiments shown herein, but to conform to the maximum extent of principles and new features that are disclosed herein.

What is claimed is:

1. A method for controlling a robot, comprising:
   acquiring an environmental map obtained by detecting a current environment;

detecting the environmental map to acquire at least one right angle corner point in the environmental map;
determining a coordinate system in which the right angle corner point is located and using the right angle corner point of which the coordinate system satisfies a preset condition as a target right angle corner point; and
controlling the robot to clean the target right angle corner point,
wherein determining the coordinate system in which the right angle corner point is located and using the right angle corner point of which the coordinate system satisfies the preset condition as the target right angle corner point comprises:
using coordinates of the right angle corner point as original points to establish a plane rectangular coordinate system;
determining grayscale values of quadrants in the plane rectangular coordinate system;
using the quadrant of which the grayscale value in the plane rectangular coordinate system satisfies a preset grayscale value as a target quadrant; and
determining the right angle corner point of which a number of the target quadrants in the plane rectangular coordinate system is greater than a preset number as the target right angle corner point.

2. The method according to claim 1, wherein detecting the environmental map to acquire the at least one right angle corner point in the environmental map comprises:
using a corner detection algorithm to process the environmental map, so as to obtain a corner detection image;
denoising the corner detection image to obtain a corner point denoising image; and
performing piecewise linear fitting on corner points in the corner point denoising image, so as to obtain the at least one right angle corner point in the environmental map.

3. The method according to claim 1, wherein controlling the robot to clean the target right angle corner point comprises:
acquiring position information of the target right angle corner point in the environmental map;
determining a target location according to the position information and a shape parameter of the robot; and
controlling the robot to move to the target location, so as to clean the target right angle corner point.

4. The method according to claim 3, wherein controlling the robot to move to the target location, so as to clean the target right angle corner point comprises:
determining an environment type and a ground attribute of the target right angle corner point;
determining a cleaning mode of the target right angle corner point according to the environment type and the ground attribute; and
controlling, according to the cleaning mode, the robot to clean the target right angle corner point.

5. The method according to claim 3, further comprising:
acquiring a detection image, wherein the detection image is obtained by scanning a position of the target right angle corner point by means of the robot at the target location;
analyzing the detection image to determine at least one object to be processed, and acquiring an object type and object information of the object to be processed;
determining a processing strategy according to the object type and the object information; and
controlling, according to the processing strategy, the robot to process the object to be processed.

6. The method according to claim 5, further comprising:
acquiring a historical processing record;
determining, according to the historical processing record, a processing period of the object to be processed; and
maintaining the target right angle corner point according to the processing period.

7. A computer-readable storage medium, comprising a stored program, wherein the program, when being operated, executes steps of the method according to claim 1.

8. An electronic device, comprising a processor, a communication interface, a memory and a communication bus, wherein the processor, the communication interface and the memory communicate with each other by means of the communication bus;
the memory is configured to store a computer program; and
a program stored, when being operated on the memory, causes the processor to:
acquire an environmental map obtained by detecting a current environment;
detect the environmental map to acquire at least one right angle corner point in the environmental map;
determine a coordinate system in which the right angle corner point is located and use the right angle corner point of which the coordinate system satisfies a preset condition as a target right angle corner point; and
control the robot to clean the target right angle corner point.

9. The electronic device according to claim 8, wherein detecting the environmental map to acquire the at least one right angle corner point in the environmental map comprises:
using a corner detection algorithm to process the environmental map, so as to obtain a corner detection image;
denoising the corner detection image to obtain a corner point denoising image; and
performing piecewise linear fitting on corner points in the corner point denoising image, so as to obtain the at least one right angle corner point in the environmental map.

10. The electronic device according to claim 8, wherein determining the coordinate system in which the right angle corner point is located and using the right angle corner point of which the coordinate system satisfies the preset condition as the target right angle corner point comprises:
using coordinates of the right angle corner point as original points to establish a plane rectangular coordinate system;
determining grayscale values of quadrants in the plane rectangular coordinate system;
using the quadrant of which the grayscale value in the plane rectangular coordinate system satisfies a preset grayscale value as a target quadrant; and
determining the right angle corner point of which a number of the target quadrants in the plane rectangular coordinate system is greater than a preset number as the target right angle corner point.

11. The electronic device according to claim 8, wherein controlling the robot to clean the target right angle corner point comprises:
acquiring position information of the target right angle corner point in the environmental map;
determining a target location according to the position information and a shape parameter of the robot; and
controlling the robot to move to the target location, so as to clean the target right angle corner point.

12. The electronic device according to claim 11, wherein controlling the robot to move to the target location, so as to clean the target right angle corner point comprises:
   determining an environment type and a ground attribute of the target right angle corner point;
   determining a cleaning mode of the target right angle corner point according to the environment type and the ground attribute; and
   controlling, according to the cleaning mode, the robot to clean the target right angle corner point.

13. The electronic device according to claim 11, wherein the program stored, when being operated on the memory, cause the processor further to:
   acquire a detection image, wherein the detection image is obtained by scanning a position of the target right angle corner point by means of the robot at the target location;
   analyze the detection image to determine at least one object to be processed, and acquiring an object type and object information of the object to be processed;
   determine a processing strategy according to the object type and the object information; and
   control, according to the processing strategy, the robot to process the object to be processed.

14. The electronic device according to claim 13, wherein the program stored, when being operated on the memory, cause the processor further to:
   acquire a historical processing record;
   determine, according to the historical processing record, a processing period of the object to be processed; and
   maintain the target right angle corner point according to the processing period.

* * * * *